United States Patent
Bahar et al.

(10) Patent No.: US 10,386,084 B2
(45) Date of Patent: Aug. 20, 2019

(54) HEAT PUMPS UTILIZING IONIC LIQUID DESICCANT

(71) Applicant: Xergy Inc, Georgetown, DE (US)

(72) Inventors: Bamdad Bahar, Georgetown, DE (US); William Parmelee, Seaford, DE (US); Luyu Jin, Newark, DE (US); Omar Abdelaziz Ahmed Abdelaziz, Knoxville, TN (US)

(73) Assignee: Xergy LTD, London (GB)

( * ) Notice: Subject to any disclaimer, the term of this patent is extended or adjusted under 35 U.S.C. 154(b) by 147 days.

(21) Appl. No.: 15/475,124

(22) Filed: Mar. 30, 2017

(65) Prior Publication Data

US 2017/0284685 A1    Oct. 5, 2017

Related U.S. Application Data

(60) Provisional application No. 62/315,634, filed on Mar. 30, 2016.

(51) Int. Cl.
  *F24F 3/14*    (2006.01)
  *B01D 53/26*   (2006.01)
  *F24F 3/00*    (2006.01)

(52) U.S. Cl.
  CPC .......... *F24F 3/1417* (2013.01); *B01D 53/263* (2013.01); *F24F 3/001* (2013.01);
  (Continued)

(58) Field of Classification Search
  CPC .. F24F 3/1417; F24F 3/001; F24F 2003/1435; F24F 2003/1458;
  (Continued)

(56) References Cited

U.S. PATENT DOCUMENTS 1,925,281 A    3/1933   Replogle
2,913,511 A   11/1959   Grubb, Jr.
(Continued)

FOREIGN PATENT DOCUMENTS

GB    235009 A    10/2016
WO    9106691     5/1991
(Continued)

OTHER PUBLICATIONS

"Engineering a Membrane Electrode Assembly," John W. Weidner et al., The Electrochemical Society Interface, Winter, 2003, pp. 40-43.

(Continued)

*Primary Examiner* — Melvin Jones
(74) *Attorney, Agent, or Firm* — Invention To Patent Services; Alex Hobson

(57) ABSTRACT

An ionic liquid desiccant system utilizes an ionic liquid desiccant to draw moisture from a working fluid, such as air that flow into an enclosure, such as a home. The desiccant may be mixed with the working fluid or a separator that allows moisture transport therethrough may be configured between the ionic liquid desiccant and the working fluid. The ionic liquid desiccant system may be part of an air conditioning system and may remove the moisture from air that is cooled by flowing over an evaporator or heat exchanger coupled with the evaporator. The ionic liquid desiccant may be pumped from a desiccant chamber to a regenerator chamber to remove absorbed moisture. A dual-purpose chamber may act as a desiccant chamber and as a regenerator chamber. A refrigeration system may have an electrochemical compressor and may utilize metal hydride heat exchangers.

20 Claims, 8 Drawing Sheets

(52) U.S. Cl.
CPC ...... *B01D 2252/30* (2013.01); *B01D 2252/60* (2013.01); *F24F 2003/1435* (2013.01); *F24F 2003/1458* (2013.01)

(58) Field of Classification Search
CPC .. B01D 53/263; B01D 2252/60; B01D 53/32; C07D 233/58; C25B 1/06
See application file for complete search history.

(56) References Cited

U.S. PATENT DOCUMENTS

| | | | |
|---|---|---|---|
| 3,432,355 | A | 3/1969 | Niedrach et al. |
| 3,489,670 | A | 1/1970 | Maget |
| 3,544,377 | A | 12/1970 | Justi, et al. |
| 4,118,299 | A | 10/1978 | Maget |
| 4,402,817 | A | 9/1983 | Maget |
| 4,523,635 | A | 6/1985 | Nishizaki et al. |
| 4,593,534 | A | 6/1986 | Bloomfield |
| 4,829,785 | A | 5/1989 | Hersey |
| 4,990,412 | A | 2/1991 | Hersey |
| 5,024,060 | A | 6/1991 | Trusch |
| 5,547,551 | A | 8/1996 | Bahar et al. |
| 5,599,614 | A | 2/1997 | Bahar et al. |
| 5,635,041 | A | 6/1997 | Bahar et al. |
| 5,746,064 | A | 5/1998 | Tsenter |
| 5,768,906 | A | 6/1998 | Tsenter |
| 5,900,031 | A | 5/1999 | Bloomfield |
| 5,961,813 | A | 10/1999 | Getermann et al. |
| 5,976,724 | A | 11/1999 | Bloomfield |
| 5,993,619 | A | 11/1999 | Bloomfield et al. |
| 6,068,673 | A | 5/2000 | Bloomfield |
| 6,167,721 | B1 | 1/2001 | Tsenter |
| 6,254,978 | B1 | 7/2001 | Bahar et al. |
| 6,321,561 | B1 | 11/2001 | Magel |
| 6,425,440 | B1 | 7/2002 | Tsenter et al. |
| 6,553,771 | B2 | 4/2003 | Tsenter |
| 6,635,384 | B2 | 10/2003 | Bahar et al. |
| 6,994,929 | B2 | 2/2006 | Barbir et al. |
| 8,640,492 | B2 | 2/2014 | Bahar |
| 8,769,972 | B2 | 7/2014 | Bahar |
| 9,005,411 | B2 | 4/2015 | Bahar et al. |
| 2002/0066277 | A1 | 6/2002 | Tsenter |
| 2003/0141200 | A1 | 7/2003 | Harada |
| 2003/0155252 | A1 | 8/2003 | Juda et al. |
| 2003/0196893 | A1 | 10/2003 | Mcelroy et al. |
| 2004/0040862 | A1 | 3/2004 | Kosek |
| 2004/0142215 | A1* | 7/2004 | Barbir ............... H01M 8/04089 429/411 |
| 2004/0211679 | A1* | 10/2004 | Wong ................... B01D 53/326 205/765 |
| 2005/0072688 | A1 | 4/2005 | Meltser |
| 2005/0274138 | A1 | 12/2005 | Golden |
| 2006/0230765 | A1 | 10/2006 | Fedorov et al. |
| 2006/0254286 | A1* | 11/2006 | Johnson ................ F04B 35/00 62/6 |
| 2008/0187794 | A1 | 8/2008 | Weingaetner |
| 2009/0214905 | A1 | 8/2009 | Narayanan et al. |
| 2009/0308752 | A1 | 12/2009 | Evans et al. |
| 2010/0132386 | A1 | 6/2010 | Bahar |
| 2011/0198215 | A1 | 8/2011 | Bahar |
| 2011/0256463 | A1 | 10/2011 | Michalske et al. |
| 2014/0260398 | A1* | 9/2014 | Kozubal ................ F25B 15/00 62/271 |
| 2017/0138653 | A1 | 5/2017 | Bahar |

FOREIGN PATENT DOCUMENTS

| | | |
|---|---|---|
| WO | 0125700 A1 | 4/2001 |
| WO | 007108 A1 | 1/2008 |
| WO | WO2008154984 A1 | 12/2008 |
| WO | 2010127270 A2 | 4/2010 |
| WO | WO2010127270 A2 | 11/2010 |
| WO | 2013096890 A1 | 6/2013 |

OTHER PUBLICATIONS

Technical Specifications for "HOGEN Hydrogen Generation Systems," Proton Energy Systems, Inc., Oct. 2008, 2 pages.

"Teledyne Titan(TM) HM Generator Series Hydrogen/Oxygen Gas Systems," Teledyne Energy Systems, Inc., Jun. 2007, 2 pages.

"A Comparative Study of Water as a Refrigerant with Some Current Refrigerants", International Journal of Energy Research, Int. J. energy res. 2005: 29.947-959.

* cited by examiner

HEAT PUMPS UTILIZING IONIC LIQUID DESICCANT

CROSS REFERENCE TO RELATED APPLICATIONS

This application claims the benefit of U.S. provisional patent application No. 62/315,634, filed on Mar. 30, 2016 and entitled Heat Pumps Utilizing Ionic Liquid Desiccant; the entirety of both applications, including references incorporated by reference therein, are incorporated herein.

STATEMENT OF GOVERNMENT LICENSE RIGHTS

This invention was made with government support under Department of Energy grant DE-EE0007040. The government has certain rights in the invention.

BACKGROUND OF THE INVENTION

Field of the Invention

This invention is directed to ionic liquid desiccants utilized in electrochemical compressors and electrochemical heat exchangers, particularly those that utilize metal hydride or other gas absorbers that are sensitive to moisture.

Background

Excessive water vapor ($H_2O$ vapor) may be an undesired component that is present in many gas sources, including ambient air. In order to improve the quality of the gas source, the amount of $H_2O$ vapor should be reduced to acceptable specifications. Various technologies have been employed for $H_2O$ vapor removal including cooling of gas streams, or treatment with chemical solvents, physical solvents, adsorbents, absorbents and membranes. One traditional technique is liquid refrigerant expansion-compression air conditioning systems.

Furthermore, processes for removal of $H_2O$ from gas sources using liquid desiccants, such as lithium chloride (LiCl) and calcium chloride ($CaCl_2$), which contact a gas source containing a high percentage of $H_2O$ with an absorbent comprising said liquid desiccant, are known. The contact occurs at absorption conditions, to absorb at least a portion of the $H_2O$ vapor from the $H_2O$ vapor-containing gas source and forming a $H_2O$ vapor-absorbent complex. Afterwards, the gas source having a reduced $H_2O$ content is recovered, and the amount of $H_2O$ vapor in the $H_2O$ absorbent complex is reduced, such as by heating.

However, known liquid desiccants are corrosive and/or toxic and, thus, have a negative impact on the environment and may result in increased time and cost to manufacture and/or maintain devices for absorbing gasses. Also, conventional liquid desiccants contain solid, inorganic salts that may precipitate out at high concentrations and low relative humidity.

SUMMARY OF THE INVENTION

The invention is directed to an electrochemical heat exchanger that utilizes an ionic liquid desiccant to remove moisture from the system.

Although desiccation is referred to in various portions of the specification, the scope of this disclosure is not limited thereto. Desiccation is a common adsorption process and is used as an exemplary adsorption process throughout the specification. However, the concepts recited herein and directed to desiccation are equally applicable to adsorption processes for other multi-pole molecules, such as $CO_2$, etc. Thus, throughout this specification "water vapor" or similar terms may be considered to encompass other multi-pole molecules.

Ionic liquids are salts in liquid state at room temperature; they can be used as desiccant materials.

Ionic liquid desiccants (ILD), are known to be bulky molecules with asymmetric organic cations. They can be designed to optimize the desorption temperature of water and provide better performance, than traditional salt solutions (e.g. Lithium Chloride) desiccant systems which are typically used in HVAC applications. In this invention, ionic liquids are referred to more generally, as a liquid that substantially contains only anions and cations, while not containing other components, such as water. Alternatively, an ionic liquid solution containing the ionic liquid and a solvent or further compound, such as water, may be used.

Conventional HVAC systems achieve cooling and dehumidification by cooling the air below its dew point in order to condense the moisture and then reheat the air to provide it at the desired conditions. In this way, there is a separation between sensible and latent cooling as air is dehumidified as close to adiabatic conditions as possible and then sensibly cooled at higher evaporating temperature.

In an exemplary embodiment, a means for integrating desiccant solutions, such as salt solution or ionic liquid desiccants, with heat exchangers used in electrochemical compression cycles is provided. The heat from the heat exchangers is used to regenerate the desiccant material, such as an ionic liquid desiccant. One objective of this invention is to improve coefficient of performance of the heat exchanger by 25 to 40% utilizing an ionic liquid desiccant. Another objective is to create a higher efficiency cooling system, wherein air or working fluid is dehumidified without over-cooling.

An objective is to provide a method for removing a vaporous component from a gas source, and a device for removing a vaporous component from a gas source, which is safer and/or less expensive to use than known methods and devices. This objective may be achieved by using an ionic liquid, or preferably a room temperature ionic liquid (RTIL), more preferably an ionic liquid that remains in a liquid state with sorbic loadings typical in a specific sorbent process, in particular as a liquid sorbent for sorption of a vapor having an electric multi-pole moment and a device using the ionic liquid for sorption of a vapor.

An ionic liquid may be used as a sorbent for sorption of a vapor having an electric multi-pole moment, wherein the ionic liquid comprises an anion and a cation. The cation may be a coordinating cation, which is capable of interacting with the multipole-moment vapor molecules by means of Coulomb forces, hydrogen bonding, Van der Waals forces, etc.

In particular, the electric multi-pole moment may be an electric dipole moment and/or an electric quadrupole moment. The sorption may be an adsorption or an absorption. Initially, the ionic liquid may be a pure ionic liquid, a liquid substantially containing only anions and cations, while not containing other components such as water. Alternatively, the initial ionic liquid may be a solution containing the ionic liquid and a solvent or further compound, such as water. In the most generic form, the ionic liquids may be represented by [Q+]n[Zn—], wherein Q represents a cation, which may be produced by a process as described, for example, in WO 2005/021484, hereby incorporated by reference in its entirety.

There are many benefits of using ionic liquids as sorbants. Ionic liquids are liquid at most working conditions and, in many cases, ionic liquids are liquid even at low temperatures. Room temperature ionic liquids may be liquid as pure substances, which means that they do not crystallize at low temperatures or low to zero water content, such as 100 ppm or less. Compared to LiCl and CaCl2, ionic liquids have very low corrosion, similar desorption temperature and enthalpies, good shape of the isotherms, are not volatile compared to triethylene glycol, and may be selected to be less toxic.

The term "ionic liquid", as used herein is a liquid organic salt that is a liquid at room temperature and consists essentially of organic cations, organic anions, inorganic anions and/or inorganic cations, wherein at least one of the ions prevents solidification at room temperature due to steric hindrance. Small amounts of additives may be dissolved in the ionic liquid such as a more classical salt, to increase the ionic character of the liquid and may be contained in a concentration of no more than about 20% and preferably no more than 10%. Moreover, additional hygroscopic or even non-hygroscopic salts with inorganic cations and organic or inorganic anions may be dissolved in the ionic liquid, containing, but not limited to, the identical anion or identical anions as found in the basic ionic liquid. The ionic liquids may have a melting point of less than about 250° C., such as less than about 200° C., less than about 175° C., less than about 150° C., less than about 125° C., and less than about 100° C. According to the generally accepted literature (e.g. Wasserscheid, Peter; Welton, Tom (Eds.); "Ionic Liquids in Synthesis," Wiley-VCH 2008; ISBN 978-3-527-31239-9), ionic liquids are melts of low melting salts with melting points equal to or below 100° C. However, the melting temperature of ≤100° C. is chosen arbitrarily by definition. Therefore, according to this application, salts with melting temperatures >100° C. but <250° C. are included as ionic liquids as well. A cation and an anion may be linked by, for example, an alkyl group to form a zwitterionic ion.

The liquid sorbant is based on ionic liquids as defined above. The ionic liquid component or components itself may not be liquid at typical working condition temperatures, e.g. −20° C. to +160° C. To keep the liquid sorbant, which is based on ionic liquids, liquid at these working temperatures, especially at the low working temperatures, additional polar solvents like water or organic solvents like alcohols, polyalcohols, ethers, polyethers, ketones, amides, sulfoxides, sulfones, esters, aminoxides, etc. can be added. The ionic liquid and the polar solvents may form a homogenous mixture, or they may form an emulsion.

The term "based on an ionic liquid," as used herein, denotes the component or group of components that have the highest percentage, and is (are) an ionic liquid(s) or is (are) formed by a mixture of ionic liquids. For example, the amount of water in the desiccant fluid may be between 1 and 90 mass %, such as between 5 and 80 mass %, between 7 and 70 mass %, between 9 and 60 mass %, and between 10 and 50 mass %. For example, the amount of molecular solvents in the desiccant fluid may be between 0.1 and 20 mass %, such as between 0.1 and 10 mass %, and between 0.1 and 5 mass %.

A device for sorption of a vapor having an electric multi-pole moment is provided, wherein the device comprises a reservoir of an ionic liquid comprising an anion and a cation. The device also comprises a surface on which the ionic liquid is dispersed and re-circulated to contact a source of gas.

The device may comprise an inlet, a container including the ionic liquid and, optionally, an outlet. The device may be used to sorb vapor having an electric multi-pole moment, e.g. $CO_2$ and/or $H_2O$ vapor, from a medium that is selected from the group consisting of compressed air, inhaled air, exhaled air, and ambient air. The device may include a heat pump or act as an air conditioner, and include a means for regenerating the ionic liquid in order to remove the sorbed di/multi-pole. The device may comprise a circuit including $CO_2$ and/or $H_2O$ vapor and the ionic liquid, which comprises an anion and a cation, as working media. Using a pair of working media containing $CO_2$ and/or $H_2O$ vapor and an ionic liquid in a device may be advantageous because $CO_2$ and/or $H_2O$ vapor are not toxic and are of less concern with respect to environmental effects compared to other vaporizable working substances.

The ionic liquid may serve as a solvent, dispersion agent, or gelling agent to dissolve, disperse or gel hygroscopic particles. The hygroscopic particles may include silica gel, alumina, activated carbon, zeolite, or molecular sieve, such as 4 A or 13× molecular sieve, polysaccharides, polyalcohols, polymer desiccants, or any other hygroscopic materials or adsorbent materials. The particles may be of 1 micron to 100 microns in size. The addition of hygroscopic particles to the ionic liquid can be chosen in order to manipulate the shape of the composite slurry isotherm. For example, the addition of molecular sieve will enhance the capacity to adsorb/absorb at low vapor pressures. Due to the large molecular size of many ionic liquids they will not have the same masking effect as LiCl and other hygroscopic salts with respect to molecular sieve, which due to their size and polarity, would be preferentially attracted to the same sites that would attract the desired sorbate.

In an exemplary embodiment, a method of using an ionic liquid for sorption of a gas having an electric multi-pole moment is provided, wherein the ionic liquid comprises a carbanion and a cation.

Such ionic liquids may be a suitable medium to sorb specific gases, e.g. CO2 vapor or H2O vapor, out of a mixture of gases with breathing air and may also be suitable to release these specific gases or vapor again. The specific gases or vapor and the ionic liquid may form a complex, wherein the specific gases or vapor may be bound in a complex. Using such ionic liquids for sorption of gases or vapors may be advantageous because ionic liquids having no, or at least substantially no vapor pressure, a non-measurable vapor pressure or even a vapor pressure in the same magnitude of order of steel, may be used. Thus, the gases, vapors, or mixture of gases and vapors may not be contaminated by vapors of the ionic liquid. For example, the removal of CO2 by using ionic liquids may exhibit an improved performance even in cases where the vapor pressure of CO2 is low. For example, the desorption process may be enhanced by providing lower pressures during desorption.

An ionic liquid-desiccant may be used in an air conditioner comprising an absorber and a regenerator. In the ionic liquid-desiccant air conditioner, process air is fed into the absorber through return air duct and leaves the absorber through a supply air duct after desiccation. The ionic liquid desiccant may be discharged by the absorber and may pass through a heat exchanger where it may be preheated by a hot ionic liquid desiccant that is discharged by the regenerator. The hot ionic liquid desiccant is generally contained within a heat exchanger, such as a finned tube coil, microchannel plate, or the like, so that any water vapor in the ionic liquid desiccant is not adsorbed by the hot ionic liquid desiccant. The preheated ionic liquid desiccant may be regenerated in the regenerator (e.g., a boiler) with regenerated ionic liquid desiccant being sent to a desiccant pump of the absorber, such as through an interchanger. Liquid water or water vapor may be discharged or recycled through an outlet duct.

The absorber may be a counterflow absorber. In this instance, an ionic liquid desiccant flow and optional cooling air are passed downward while the gas stream is passed upward. The ionic liquid desiccant flow is optionally collected in a desiccant reservoir for subsequent return to the regenerator, such as through an interchanger.

The absorber may be a crossflow absorber. In this instance, an ionic liquid desiccant flow, and optional cooling air are passed downward while the gas stream is passed horizontally. The ionic liquid desiccant flow is optionally collected in a desiccant reservoir for subsequent return to the regenerator, such as through an interchanger.

Either the counter flow or crossflow absorbers may further comprise a cooling water flow or a water blend flow (hereinafter referred to as cooling water flow) to cool the air being treated and remove the heat of sorbtion that is released when the sorbent is adsorbed. This cooling water flow is generally contained within a heat exchanger, such as a finned tube coil, microchannel plate, or the like, so that the cooling water flow is not adsorbed by the desiccant.

To increase the amount and duration of contact between the process gas and the ionic liquid desiccant, the absorber may comprise one or more of a variety of extended surfaces. In general, the contact between the ionic liquid desiccant and the gas stream to be dehumidified is characterized by an extension of the surface area of the ionic liquid desiccant. This may be accomplished by contacting the ionic liquid desiccant with an extended surface, which may or may not be cooled, that provides enhanced vapor transfer and heat transfer mechanisms. Such extended surfaces are characterized by high surface area to volume ratio, and in the case of Ionic liquid desiccants, an ability to flow the ionic liquid desiccant over the extended surface enables, and may enhance, the heat and mass transfer by increasing the amount and duration of contact between the ionic liquid desiccant and the gas stream. Such extended surfaces are known and examples include various ones from atomization (least preferential and not requiring a structured surface), cross-corrugate media, random pack medium, structured pack medium, wicking blades, and others not specified herein. Because the ionic liquid desiccant may be selected to be non-corrosive, especially when compared to traditional liquid desiccants LiCl and CaCl2, the extended surfaces may be constructed of common materials such as aluminum, copper, ferrous materials, and alloys thereof as well as polymeric, cellulosic materials, and organic or inorganic fibrous materials.

The extended surfaces may be present in an isolated enclosure, or in an enclosure with heating or cooling elements, such as coils. In the case where the surfaces are present in a chamber with heating or cooling elements, because of the non-corrosive nature of the ionic liquid desiccant, the heating or cooling elements may be constructed of common heat transfer material, such as copper, aluminum, ferrous materials, and alloys thereof.

The surfaces may be treated to reduce the surface tension to provide even flow of the ionic liquid desiccant. Such surface treatments may include flocking materials, scrims, chemical and physical surface etching, or plasma or corona field treatments, to name a few.

The ionic liquid desiccant may be flowed over the surfaces and brought in contact with the gas stream. The interaction of the dried or partially dried ionic liquid desiccant with the gas stream containing moisture causes the moisture to change from its gaseous phase in the gas stream to its liquid phase in the ionic liquid desiccant stream, in part because the dried ionic liquid desiccant stream will have a lower vapor pressure that the moist gas stream. The flow rate of the ionic liquid desiccant is from about 0.1 gpm/1000 scfm to about 10 gpm/1000 scfm, such as from about 0.5 gpm/1000 scfm to about 5 gpm/1000 scfm, from about 0.5 gpm/1000 scfm to about 2 gpm/1000 scfm, or from about 6 gpm/1000 scfm to about 8 gpm/1000 scfm.

The temperature of the gas stream during the absorption may be about ambient temperature, such as 25° C. The temperature of the ionic liquid desiccant during the absorption may be from about 50° C. to about 90° C. or about 100° C. to about 175° C., about 50° C. to 80° C., or about 120° C. to 175° C. The relative humidity of the gas stream during the absorption may be from about 20% to about 100%, such as from about 30% to about 90%, about 40% to about 80%, about 50% to about 70%, or about 60%. The relative humidity of the treated gas stream after absorption may be from about 1% to about 50%, such as from about 5% to about 45%, from about 10% to about 40%, from about 15% to about 35%, from about 20% to about 30%, or about 25%. Typically, the relative humidity of the treated gas stream after absorption is below 40%.

By heating the ionic liquid desiccant before it is flowed over, for example, the extended surfaces, the water content in the ionic liquid desiccant before absorption may be from about 1 to about 60% water or sorbate per mass of ionic liquid, such as from about 10 to about 50% water or sorbate per mass of ionic liquid. This allows the ionic liquid desiccant to absorb more water vapor from the gas stream per unit volume of the ionic liquid desiccant, thus making it possible to reduce the amount and/or flow rate of the ionic liquid desiccant that is flowed over the surfaces. The flow rate of the ionic liquid desiccant during absorption may be from about 0.1 gpm/1000 scfm to about 10 gpm/1000 scfm, such as from about 0.5 gpm/1000 scfm to about 5 gpm/1000 scfm, from about 0.5 gpm/1000 scfm to about 2 gpm/1000 scfm, when passed over cooled surfaces. The flow rate of the ionic liquid desiccant during absorption may be from about 6 gpm/1000 scfm to about 8 gpm/1000 scfm, such as from about 6.5 gpm/1000 scfm to about 7.5 gpm/1000 scfm, from about 6.75 gpm/1000 scfm to about 7.25 gpm/1000 scfm, or about 7.0 gpm/1000 scfm when not passed over cooled surfaces.

After the ionic liquid desiccant flows across the surfaces, the ionic liquid desiccant exits the device with a higher concentration of water and higher vapor pressure. All or a portion of this less concentrated ionic liquid desiccant is then transported to a separate area where the desiccant is desorbed. The desorption may be accomplished by a variety of means ranging from direct water boil off to heating of the ionic liquid desiccant and passing air over the heated surface of the ionic liquid desiccant to evaporate water to the passing air. The later process may also be aided by the extended surface mechanisms discussed above.

Due to the non-corrosive nature of the selected ionic liquid desiccants the cooled extended surfaces used in this invention need not be produced of exotic materials, or with exotic designs. In exemplary embodiments, the liquid desiccant is flowed over a traditional cooling coil made of traditional materials, i.e., copper or aluminum tubes with aluminum fins, however, other metals may also be selected.

Ionic liquid desiccants may also be used in dehumidification devices to remove water vapor from gas streams, such as air, in much the same way as described above. However, dehumidification devices are generally open systems and, thus, it is important that the desiccant used is not toxic. Various ones of the anions and cations for use in ionic liquid desiccants described herein are generally not toxic and, thus, are safe for use to treat gas sources that will be inhaled after treatment. However, even some of the liquid desiccants described herein that may be toxic may be useful in certain applications.

A separator membrane that is used to separate the ionic liquid desiccant from a working fluid or regenerator air may be substantially impermeable and have not bulk airflow therethrough, wherein the separator has a Gurley Densometer time of more than 200 seconds, as measured by a 4340 Gurley Densometer. A separator may comprise an ionomer or an ionomer membrane that may be reinforce with a reinforcing material, such as a polymer membrane.

It is to be understood that an ion exchange membrane of an electrochemical compressor may be re-hydrated after dehydration by an liquid ionic desiccant. A liquid ionic desiccant may desorb water from a metal hydride within a heat exchanger and as a result may dehydrated the ion exchange membrane, such as a polymer electrolyte membrane. The ion exchange membrane may be rehydrated by any conventional methods including the introduction of moisture directly to the ion exchange membrane or introduction to a gas flow to the electrochemical compressor, for example.

Ionic liquid desiccants may be used in heat exchanger applications as described in U.S. provisional patent application No. 62/300,082, filed on Feb. 26, 2016 and entitled, Advanced Metal Hydride Heat Pump Using Electrochemical Hydrogen Compressor; the entirety is hereby incorporated by reference herein.

This application incorporates by reference the entirety of U.S. patent application Ser. No. 15/403,299, filed on Jan. 11, 2017, entitled Advanced Metal Hydride Heat Transfer System Utilizing An Electrochemical Hydrogen Compressor and currently pending.

This application incorporates by reference the entirety of U.S. patent application Ser. No. 15/173,854, Jun. 6, 2016, entitled Electrochemical Compressor Utilizing A Preheater and currently pending.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
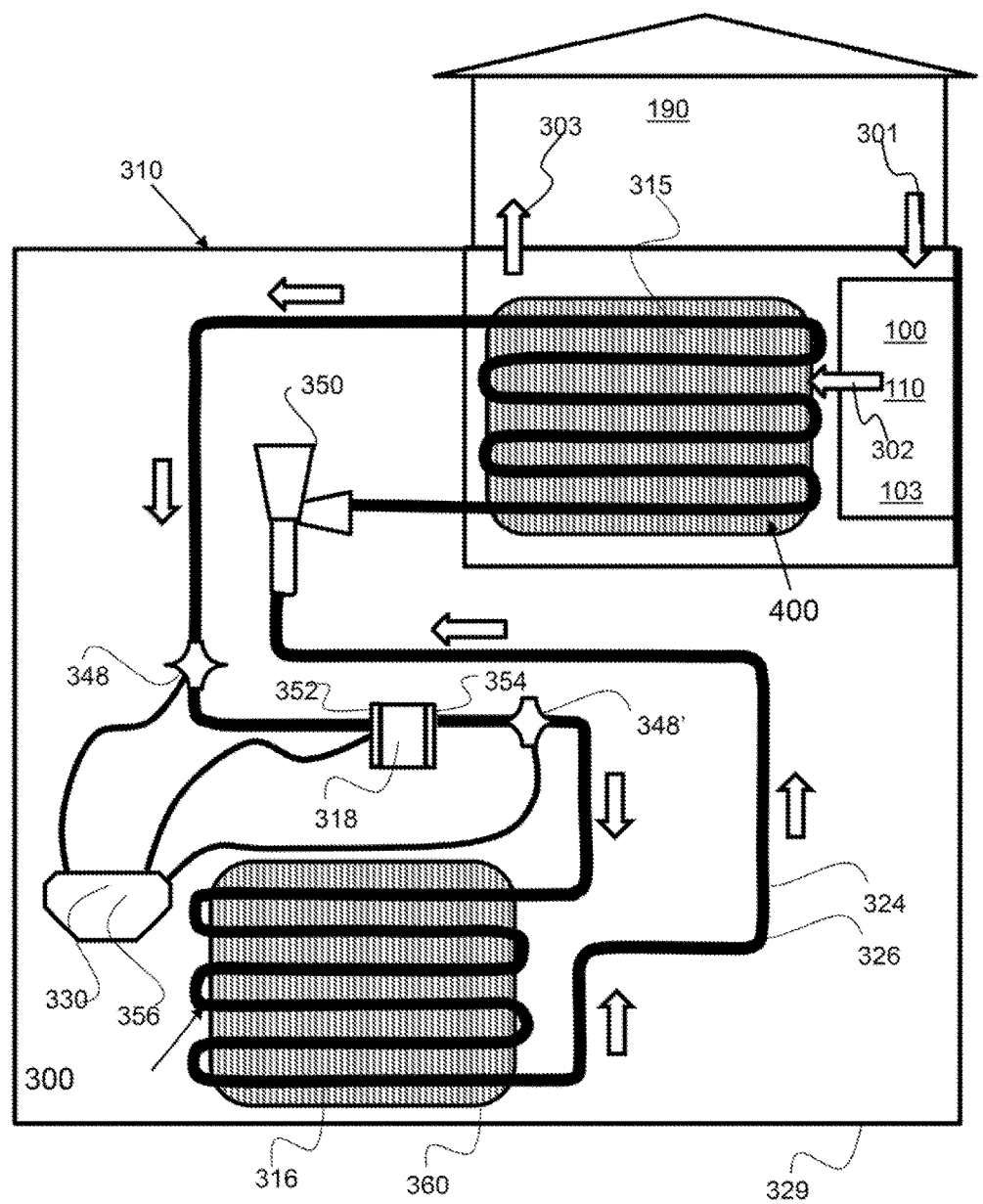
FIG. 1 shows a diagram of an exemplary refrigeration system comprising an ionic liquid desiccant system configured to reduce the moisture content of air before entering the enclosure.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Definitions

As used herein, the terms "vapor" and "vaporous" may be used interchangeably.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

Figure 2:
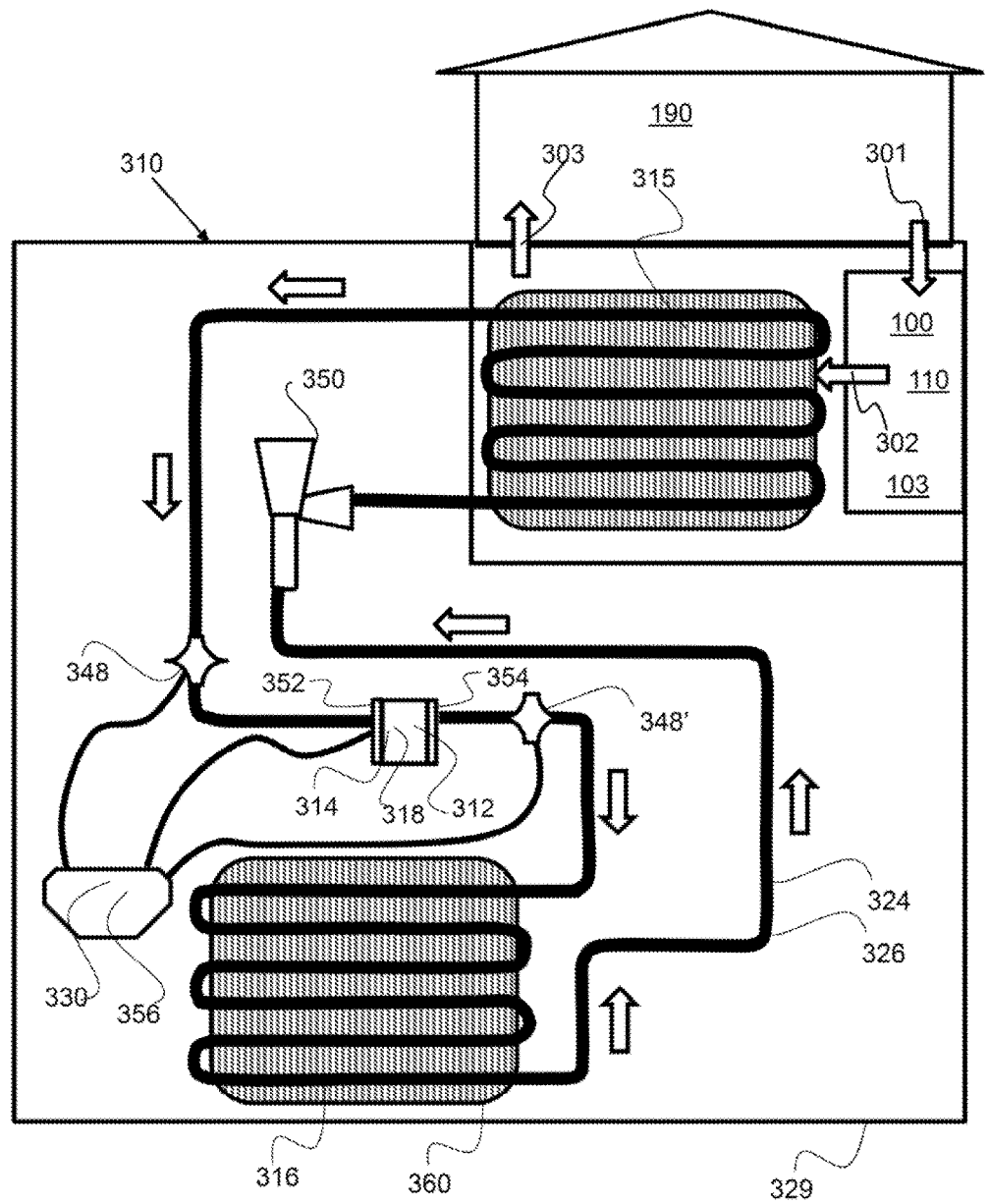
FIG. 2 shows a diagram of an exemplary refrigeration system comprising an electrochemical compressor.

Referring to FIGS. 1 and 2, an exemplary refrigeration system 310 comprises a compressor 318 a condenser 316 and expansion valve 350 and an evaporator 315. The evaporator cools the air before it enters into an enclosure 190. A liquid ionic desiccant system 100 is configured to reduce the moisture content of the incoming air 301 into the desiccant chamber 103. The outlet air 302 from the desiccant chamber will have a lower moisture content than the incoming air. The air entering the enclosure 303 will be cool and dry. The enclosure shown is a home. Note that the desiccant chamber may be configured before or after the evaporator or cooling device. The compressor has a low pressure side 352 and a high pressure side 354. In FIG. 1, the compressor is a mechanical compressor and in FIG. 2 the compressor is an electrochemical compressor 312 comprising a membrane electrode assembly 314. The refrigeration system has a plurality of sensors 348, a controller 330 that may run a control program 356 on a microprocessor, for example. The desiccant chamber 103 comprises a liquid ionic desiccant 110 that absorbs moisture from the incoming air 301.

Figure 3:
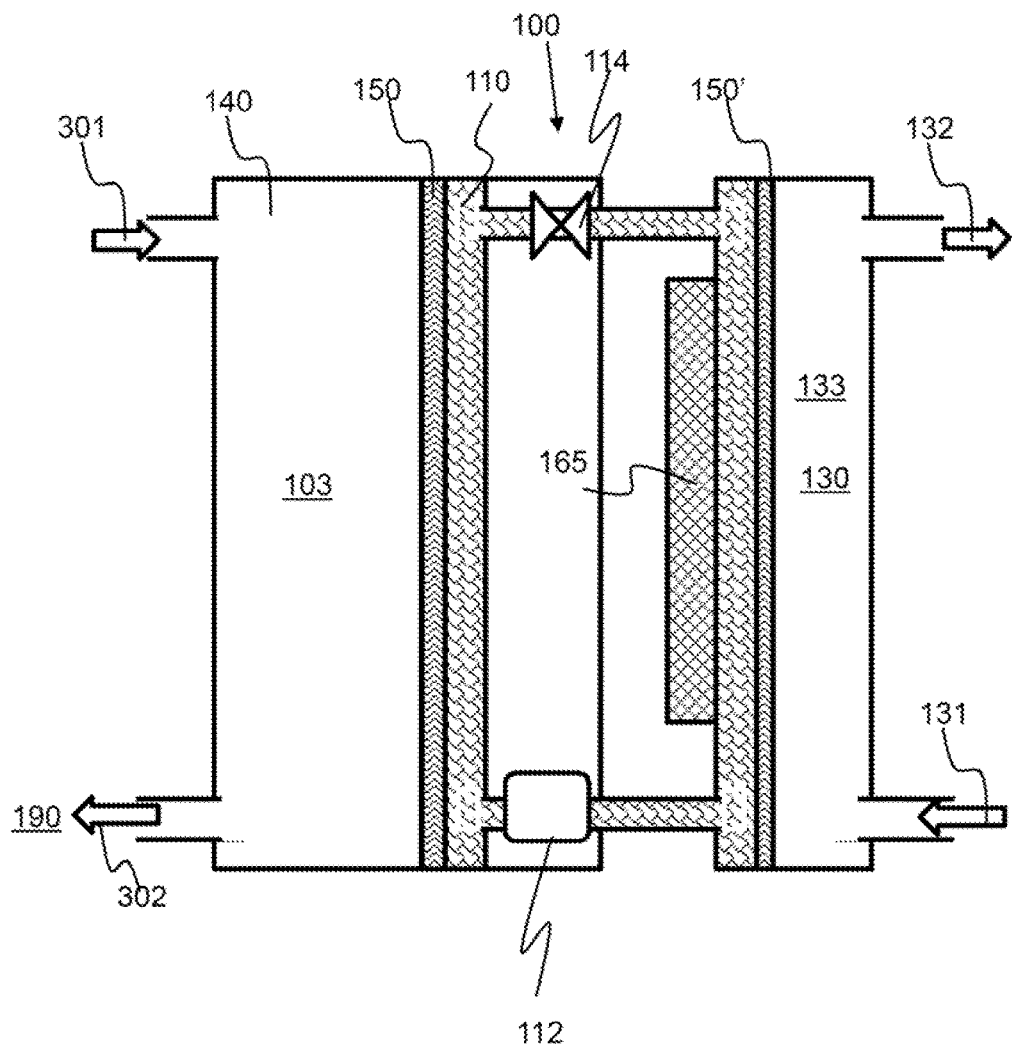
FIG. 3 shows a diagram of an exemplary ionic liquid desiccant system having a desiccant chamber and a separate regenerator chamber.

As shown in FIG. 3, an exemplary ionic liquid desiccant system 100 has a desiccant chamber 103 and a regenerator chamber 130. The ionic liquid desiccant 110 is separated from the desiccant chamber by a separator 150. The ionic liquid desiccant 110 is pumped by pump 112 from the desiccant chamber 103 to the regenerator chamber 130. The ionic liquid desiccant 110 is separated from the regenerator chamber 130 by a separator 150'. A working fluid 140, such as air circulated from or pumped into an enclosure 190 flows, through the desiccation chamber from the inlet to the outlet and transfers working fluid moisture to the liquid ionic desiccant. The inlet air 301 has an inlet working fluid moisture concentration that is greater than the outlet working fluid moisture concentration in the outlet air 302. The ionic liquid is pumped to the regenerator, wherein the moisture is transferred to a regenerator air 133, wherein the inlet regenerator air 131 has a lower moisture concentration than the outlet regenerator air 132. The regenerator air may be air from outside the enclosure, or it may be air from within the enclosure that is pumped from the enclosure, through the regenerator chamber and out from the desiccant system and the enclosure 190. A heating element 165, such as a condenser or heat exchanger coupled with a condenser may provide heat to the ionic liquid desiccant within the regenerator to heat it and drive off the moisture.

Figure 4:
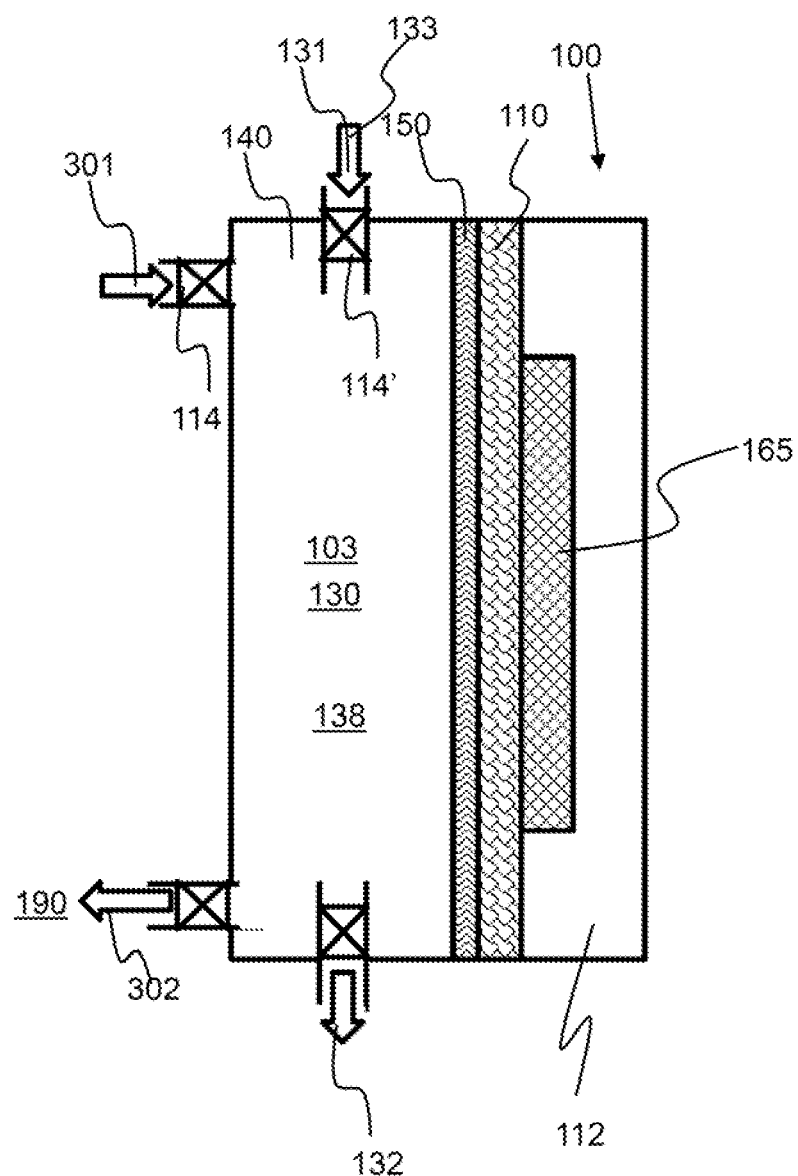
FIG. 4 shows a diagram of an exemplary ionic liquid desiccant system having a chamber that acts as both a desiccant chamber and a regenerator chamber.

As shown in FIG. 4, an exemplary ionic liquid desiccant system 100 has a dual purpose chamber 138 that acts as a desiccant chamber 103 and a regenerator chamber 130. The ionic liquid desiccant 110 is separated from this dual purpose chamber by a separator 150. In a desiccant mode, a working fluid 140, such as air circulated from or pumped into an enclosure 190, flows through the desiccation chamber from the inlet to the outlet and transfers working fluid moisture to the liquid ionic desiccant 110. The inlet air 301 has an inlet working fluid moisture concentration that is greater than the outlet working fluid moisture concentration in the outlet air 302. The ionic liquid is pumped to the regenerator, wherein the moisture is transferred to a regenerator air 133, wherein the inlet regenerator air 131 has a lower moisture concentration than the outlet regenerator air 132. Valves 114 may close and valves 114' may open to allow a regenerator air to flow through the dual-purpose chamber 138 and draw out moisture from the ionic liquid desiccant 110. A heating element 165, such as a condenser or heat exchanger coupled with the condenser of a refrigeration system act as the heating element 165. The cycle between desiccant mode and regeneration mode may alternate to provide a flow of dry air to the enclosure 190. The regenerator air may be from outside of the enclosure, such as from outside of the home. Note that the regenerator air may be any suitable type of gas, not simply ambient air from within the enclosure or from outside of an enclosure and may be nitrogen or some other gas that is specific for drawing out moisture from the ionic liquid desiccant.

Figure 5:
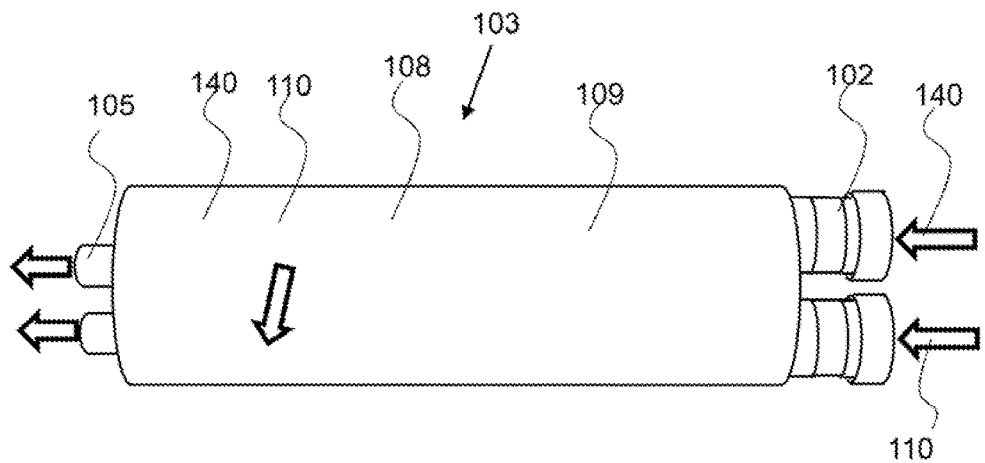
FIG. 5 shows an exemplary gas storage chamber of an electrochemical compressor system.

As shown in FIG. 5, an exemplary desiccant chamber 103, comprises an enclosure 108 that comprises an interior 109 for the transfer of moisture from a working fluid 140, such as hydrogen, to an ionic liquid 110. The descant chamber has an inlet 102 and outlet 105 wherein the working fluid and ionic liquid are circulated into the interior 109.

Figure 6:
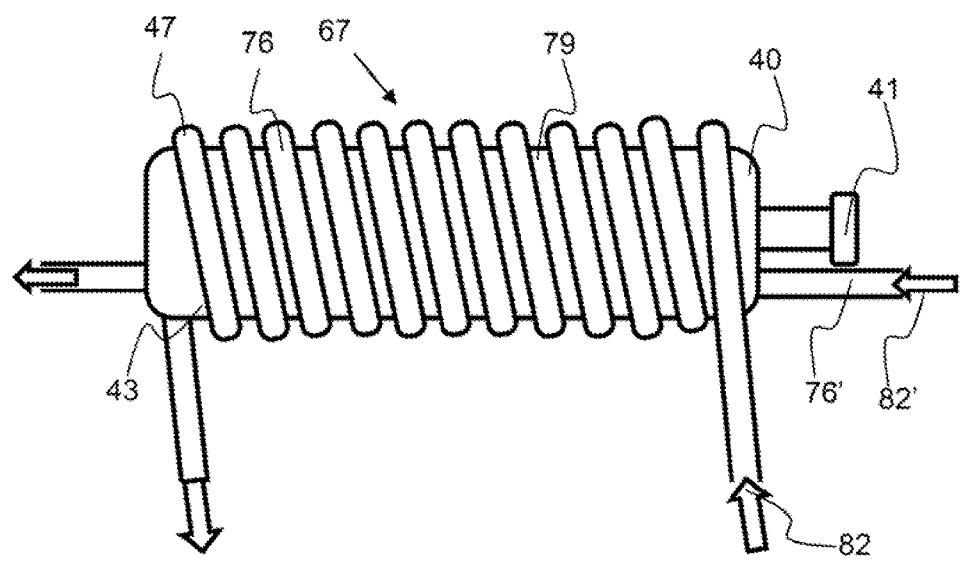
FIG. 6 shows an exemplary heat exchanger comprising a coil around a gas containment vessel.
Figure 7:
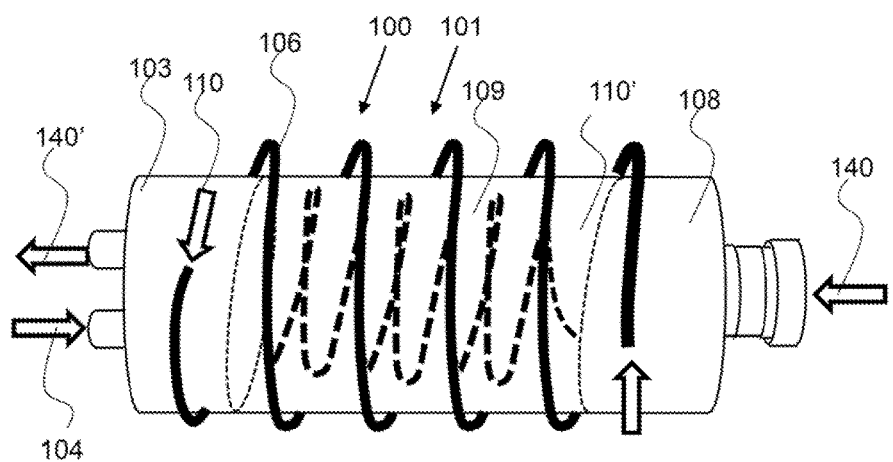
FIG. 7 shows a diagram of an exemplary heat exchanger comprising a coil around a gas containment vessel.

FIG. 6 shows an exemplary metal hydride heat exchanger 67 has a metal hydride reservoir 40 and a heat exchange device 47. The metal hydride reservoir is a tube 79 that contains a metal hydride 43. The heat exchanger device 47 comprises a heat transfer conduit 76 that is coiled around the tube, or cylinder and a heat transfer fluid 82 passes through the conduit. The heat transfer device 47 also comprises a heat transfer conduit 83' that is in direct communication with the metal hydride. As shown, the heat transfer conduit 83' passes through the cylinder or tube, wherein the conduit is in direct contact with the metal hydride 43. The interior heat transfer conduit 76' may be coiled around the interior of the cylinder to increase thermal conductivity. The heat transfer fluid may be a gas, or a liquid, such as water. Any suitable type of heat exchange fluid may be configured to flow through secondary loop as described herein As shown in FIG. 7, an exemplary ionic liquid heat exchanger 100 comprises a coil 106 around a gas containment vessel 108. The gas containment vessel comprises an interior for the flow of a working fluid 140, such as hydrogen. A liquid, such as an ionic liquid 110 may flow through the coil to transfer heat to or from the gas containment chamber. An ionic liquid 110' may flow through the interior of the containment vessel 109 and mix with the working fluid desiccate the working fluid 140, such as hydrogen. The containment vessel may be a desiccant chamber 103 and part of a desiccant system 101, when the working fluid transfers moisture to the ionic liquid therein.

Figure 8:
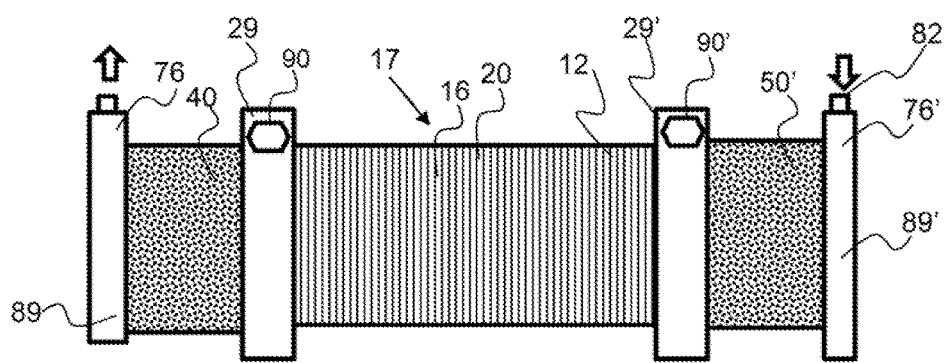
FIG. 8 shows a diagram of an exemplary electrochemical heat exchanger system.

Referring now to FIG. 8, an exemplary integrated electrochemical compressor and metal hydride heat exchanger 17 has a heat transfer fluid conduit 76 in thermal communication with the metal hydride reservoir 40. A first heat exchange conduit 76 may extend on the anode side of the cell and a second conduit may extend only on the cathode side of the cell stack 20 and a second heat exchange conduit 76 may extend on the cathode side of the cell. A heat conduit may extend over a plurality of the electrochemical cells 16, or down over the electrochemical stack. One heat exchange conduit may extend over the cells that are absorbing hydrogen and releasing heat, while the other may extend over, or be in thermal communication, with the cells that are desorbing hydrogen and conducting heat. A heat exchange conduit may extend from one side of a cell, the anode side, to a cathode side, especially when there are two or more cells, or a cell stack 20. Since the metal hydride reservoirs alternate between hot and cold, it is possible that a bipolar plate could be hot on one side and cold on another. It is therefore preferable for adjacent cells to alternate in polarity so that two hot sides, or two cathodes, are always adjacent to each other and the bipolar plate, as show in FIG. 24. Also, it is preferable that the plumbing of the heat exchange fluid alternate between adjacent cells so that it can draw the cool and hot side thermal transfers separately.

Figure 9:
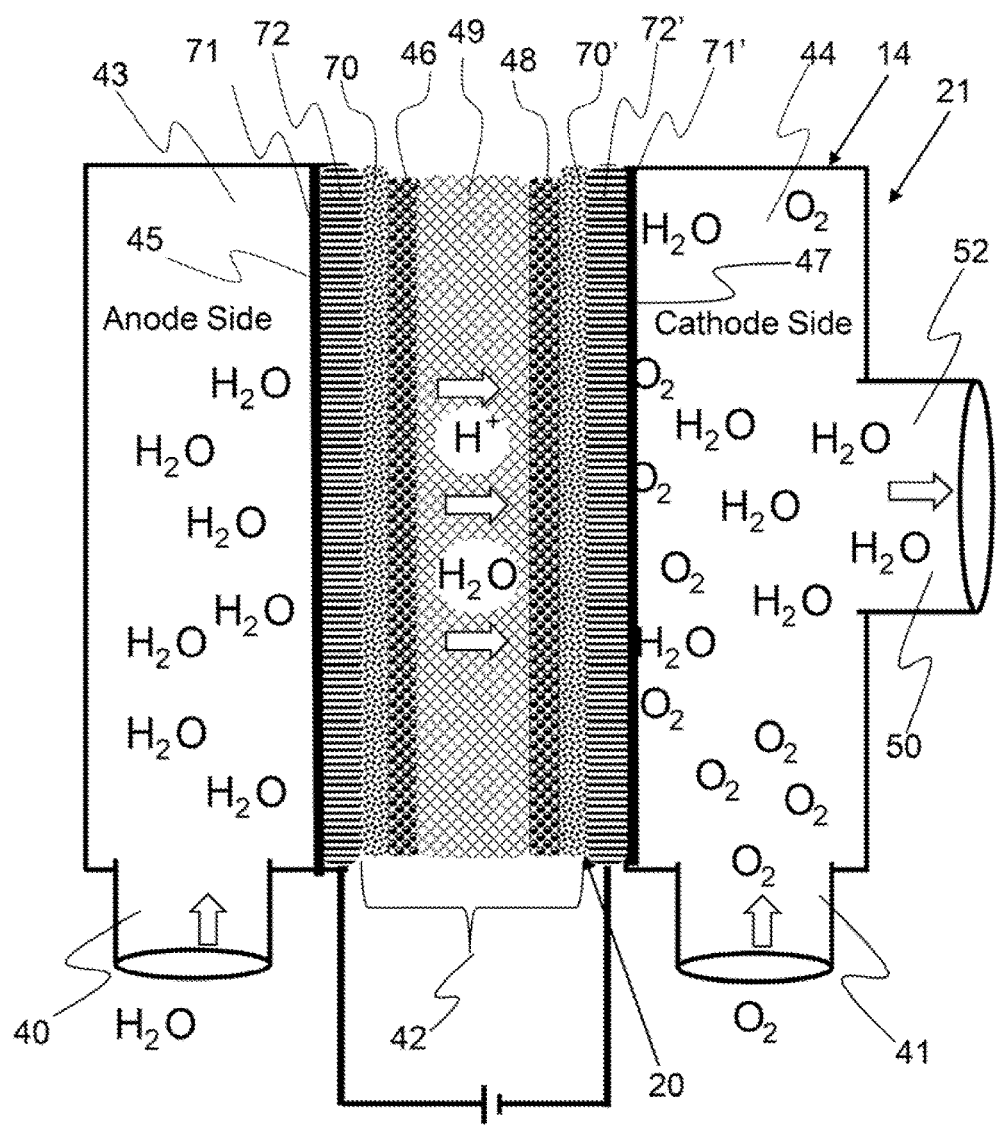
FIG. 9 shows a diagram of an electrochemical compressor.

As shown in FIG. 9, an electrochemical compressor 21 comprises a fuel cell 14 having an anode 46, a ion conductive membrane 49 and a cathode 48. Water is introduced on the anode side 45 and is converted into protons, $H^+$, that are transported across the ion conducting membrane 49 to the cathode side 47. A gas diffusion media 70, 70' is configured in direct and electrical contact with the anode and cathode respectively. An exemplary fuel cell 14 comprises an electrochemical cell 20. The fuel cell comprises a membrane electrode assembly 42 comprising a proton conducting membrane 49, an anode 46 and cathode 48. A membrane electrode assembly may in some cases include a gas diffusion media 70, 70'. A flow field 72, 72', typically comprising an electrically conductive plate having channels for the delivery of gasses to the surface of the membrane electrode assembly, is configured on either side of the membrane electrode assembly. The anode side 45 of the fuel cell converts hydrogen to protons, $H^+$, which are then transported across the membrane to the cathode side 47. At the cathode, the protons react with oxygen to produce water and the water produced moves through the compressor outlet 52 and into conduit 50. This transfer, or pumping, of protons across the membrane produces an increased pressure on the cathode side. The anode side 45 is the low pressure side 43, and the cathode side 47 is the high pressure side 44 of the electrochemical compressor 20. The hydrogen inlet 40 and oxygen inlet 41 are shown It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

The invention claimed is:

1. An air treatment system comprising:
 a) a desiccation system comprising:
  i) a desiccation chamber having:
   an inlet; and
   an outlet;
  ii) a liquid ionic desiccant that is a liquid at room temperature;
  iii) a working fluid that flows through said desiccation chamber from the inlet to the outlet and transfers working fluid moisture to the liquid ionic desiccant;
  wherein an inlet working fluid moisture concentration is greater than an outlet working fluid moisture concentration; and
  wherein the liquid ionic desiccant consists essentially of a cation and an anion that have steric hindrance to prevent crystallization at room temperature.

2. The air treatment system of claim 1, wherein the cation is an inorganic cation.

3. The air treatment system of claim 1, wherein the anion is an inorganic anion.

4. The air treatment system of claim 1, wherein the liquid ionic desiccant comprises no more than 20% of an additive.

5. The air treatment system of claim 4, wherein the additive is a salt.

6. An air treatment system comprising:
 a) a desiccation system comprising:
  i) a desiccation chamber having:
   an inlet; and
   an outlet;
  ii) a liquid ionic desiccant that is a liquid at room temperature;
  iii) a working fluid that flows through said desiccation chamber from the inlet to the outlet and transfers working fluid moisture to the liquid ionic desiccant;
  wherein an inlet working fluid moisture concentration is greater than an outlet working fluid moisture concentration;
 wherein the liquid ionic desiccant is in direct contact with the working fluid in the desiccation chamber.

7. An air treatment system comprising:
 a) a desiccation system comprising:
  i) a desiccation chamber having:
   an inlet; and
   an outlet;
  ii) a liquid ionic desiccant that is a liquid at room temperature;
  iii) a working fluid that flows through said desiccation chamber from the inlet to the outlet and transfers working fluid moisture to the liquid ionic desiccant;
  wherein an inlet working fluid moisture concentration is greater than an outlet working fluid moisture concentration:
 b) a moisture separator that separates the liquid ionic desiccant from the working fluid in the desiccation chamber and wherein working fluid moisture is transferred across the moisture separator.

8. The air treatment system of claim 7, wherein the moisture separator has no bulk flow of gas.

9. The air treatment system of claim 8, wherein the moisture separator is an ionic transport membrane.

10. The air treatment system of claim 9, wherein the moisture separator comprises an ionomer.

11. The air treatment system of claim 1, wherein the desiccant chamber receives heat from a heating element and wherein said heat increases the temperature of the liquid ionic desiccant to reduce a liquid ionic desiccant moisture level.

12. The air treatment system of claim 11, wherein a flow of regenerator air flows through the desiccant chamber to carry away moisture from the liquid ionic desiccant while it is being heated.

13. The air treatment system of claim 11, wherein the air treatment system is an air conditioning system that further comprises an evaporator for reducing the temperature of the air.

14. The air treatment system of claim 13, wherein the air conditioning system comprises a condenser that creates heat and wherein the heat is in communication with a regenerator that contains the liquid ionic desiccant, and wherein the liquid ionic desiccant is regenerated by said heat, wherein an inlet liquid ionic desiccant moisture level is higher than an outlet liquid ionic desiccant moisture level as it passes through the regenerator.

15. The air treatment system of claim 14, wherein the liquid ionic desiccant is transferred from the desiccant chamber to the regenerator.

16. The air treatment system of claim 14, wherein the desiccant chamber receives heat from a heating element and wherein said heat increases the temperature of the liquid ionic desiccant to reduce a liquid ionic desiccant moisture level.

17. The air treatment system of claim 16, wherein a secondary flow of gas flows through the desiccant chamber to carry away moisture from the liquid ionic desiccant while it is being heated.

18. An air treatment system comprising:
 a) a desiccation system comprising:
  i) a desiccation chamber having:
   an inlet; and
   an outlet;

ii) a liquid ionic desiccant that is a liquid at room temperature;

iii) a working fluid that flows through said desiccation chamber from the inlet to the outlet and transfers working fluid moisture to the liquid ionic desiccant;

wherein an inlet working fluid moisture concentration is greater than an outlet working fluid moisture concentration;

wherein the air treatment system is part of b) an electrochemical heat transfer device comprising:

i) a working fluid comprising hydrogen;

ii) a first electrochemical hydrogen compressor comprising:
an anode;
a cathode;
a proton exchange membrane;

iii) a power supply coupled to the anode and cathode to transfer the hydrogen across the proton exchange membrane;

wherein the hydrogen flows through the desiccant chamber to reduce the working fluid moisture level.

19. The air treatment system of claim 18, wherein the electrochemical heat transfer device further comprises:

a) a first gas containment chamber comprising a metal hydride;

b) a first heat transfer device coupled to said first gas containment chamber;

wherein moisture within the working fluid is absorbed by the liquid ionic desiccant;

wherein the electrochemical hydrogen compressor transfers hydrogen to said first gas containment chamber and wherein hydrogen is absorbed by the metal hydride and heat is transferred to the heat exchange device; and wherein the electrochemical heat transfer device is a heating device.

20. The electrochemical heat transfer device of claim 19, wherein the liquid ionic desiccant is heated by the heat transfer device to drive absorbed moisture from the liquid ionic desiccant.

* * * * *